May 31, 1949.  W. BENNETT  2,471,555
TRAILER COUPLING
Filed Sept. 20, 1946  3 Sheets-Sheet 2
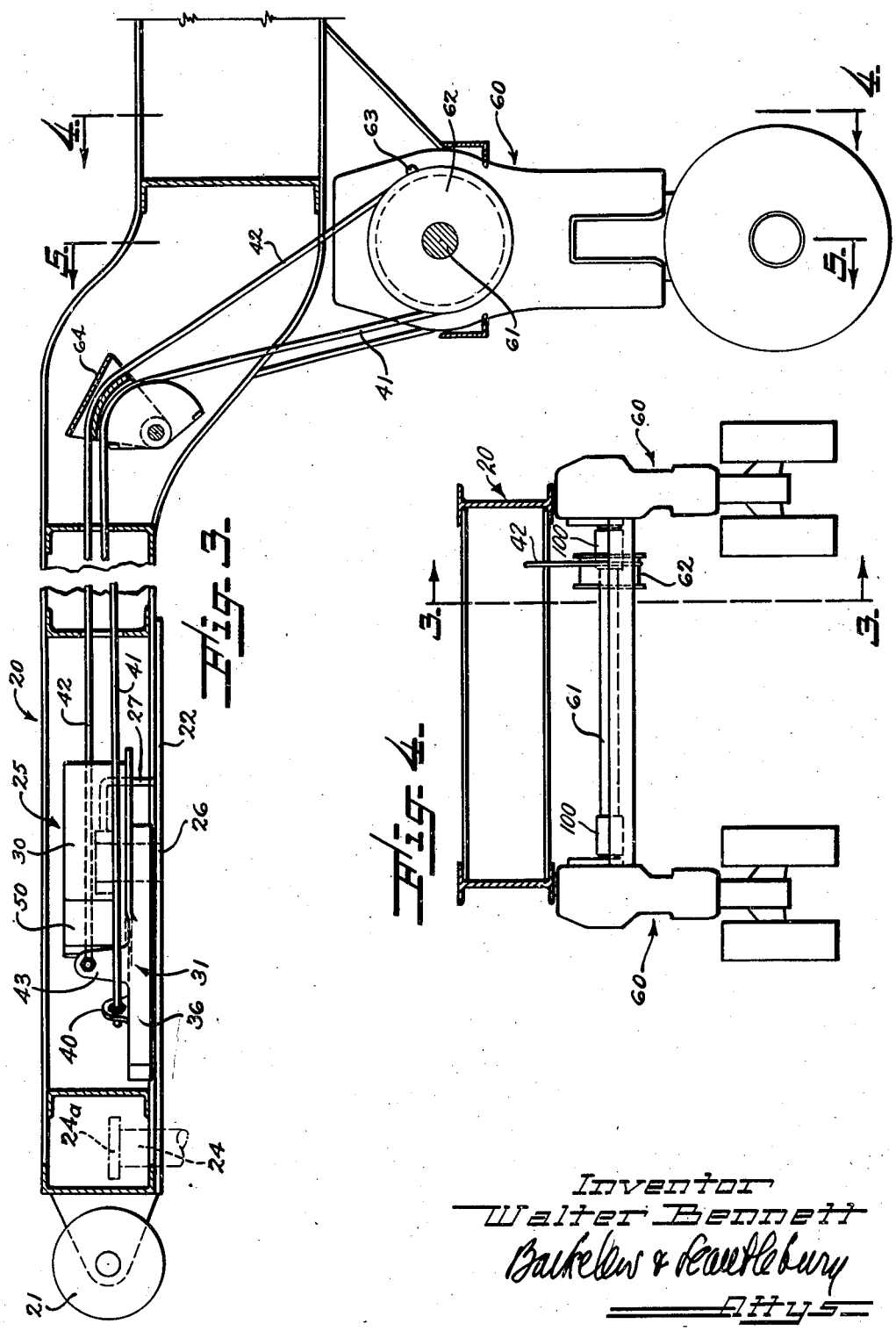

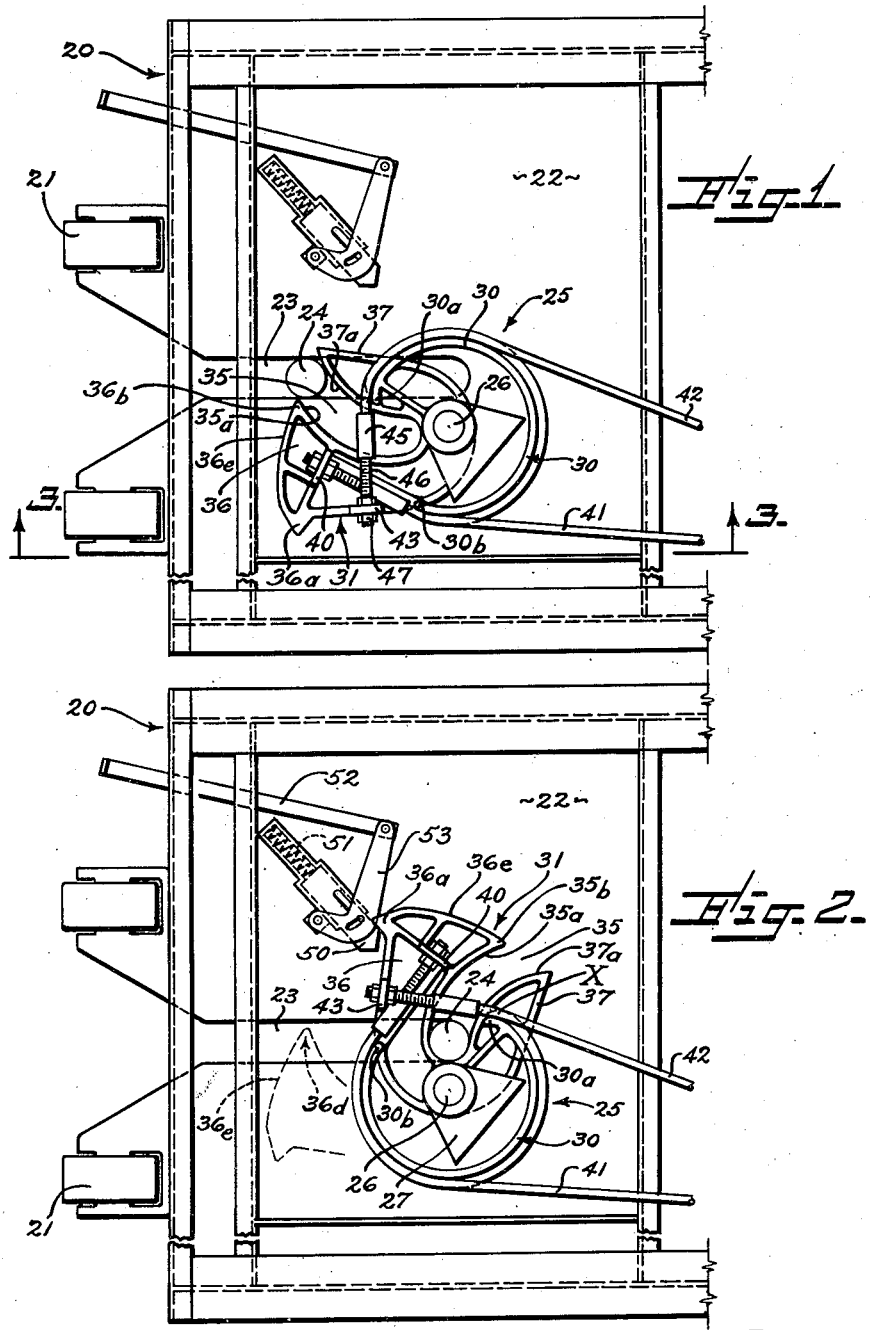

May 31, 1949. W. BENNETT 2,471,555
TRAILER COUPLING
Filed Sept. 20, 1946 3 Sheets-Sheet 3
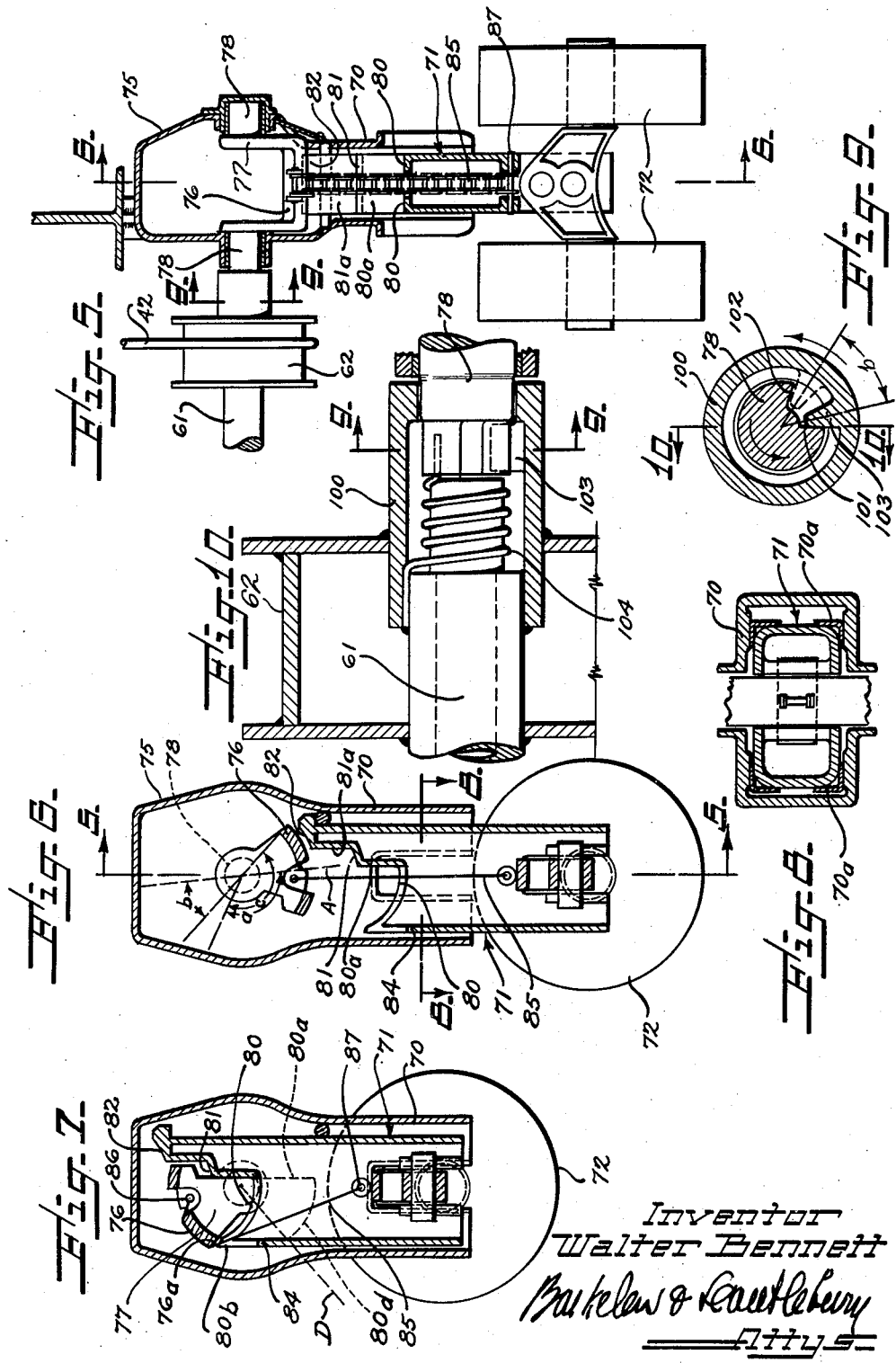
Inventor
Walter Bennett
Bartelow & Casselbury
Attys Patented May 31, 1949

2,471,555

UNITED STATES PATENT OFFICE 2,471,555

TRAILER COUPLING

Walter Bennett, Los Angeles, Calif., assignor to Utility Trailer Manufacturing Company, Los Angeles, Calif., a corporation of California Application September 20, 1946, Serial No. 698,094

12 Claims. (Cl. 280—33.05)

This invention relates to the coupling and support of semi-trailers; the general purpose of the invention being to provide a simplified form of cooperative mechanism which cooperates the coupler with the trailer support in such manner as to insure the support being in fully operative position to support the trailer when the coupler is released or opened to free the trailer from the towing vehicle.

One of the major characteristics of the invention, and which contributes much to its simplicity, resides in its capability of utilizing and preferably, in its provision of a simple form of flexible connection between the coupler and support—involving a flexible connecting member such as a chain or cable or any other flexible element which performs the function of a belt. Linkage systems including such elements as push rods, shafts, arms and links have commonly been heretofore used for connection between the coupler and support. Such connective arrangements have usually involved not only a plurality of members but have also necessitated some accuracy in the mounting of those members in bearings upon the trailer frame. The use of a simple flexible member as the interconnective element does away with most of the necessity for accurate mounting.

In an interconnected system utilizing a flexible interconnective element such as a cable, it is another feature of my invention that it provides means which compensate for elastic stretch of the cable, making certain that the support is in its fully effective supporting position, forced to that position if necessary, and finally locked in that position, before the coupler can open to release the trailer from the towing vehicle. The provisions of the invention for that and other purposes, and other objects and characteristics of the invention, will be best understood from the following detailed description of an illustrative and specific embodiment of the invention. For the purpose of this description reference is had to the accompanying drawings in which Fig. 1 is a plan showing the forward end of a trailer frame equipped with my improved coupler, in an illustrative form; the coupler being shown in its open position;

Fig. 2 is a similar plan showing the coupler in its closed position;

Fig. 3 is an enlarged longitudinal vertical section showing the parts which are shown in Figs. 1 and 2 and also showing a typical form of drop leg support for the trailer and the cable interconnection between the coupler and the drop leg support;

Fig. 4 is a reduced cross section taken as indicated by line 4—4 on Fig. 3;

Fig. 5 is a detailed cross section on line 5—5 of Fig. 3 and at the scale of Fig. 3;

Fig. 6 is a detail cross section on line 6—6 of Fig. 5, showing the drop leg lowered and in trailer supporting condition;

Fig. 7 is a similar section showing the drop leg raised;

Fig. 8 is an enlarged detail section on line 8—8 of Fig. 6;

Fig. 9 is an enlarged section taken as indicated by lines 9—9 of Figs. 5 and 10, and Fig. 10 is a section taken as indicated by line 10—10 on Fig. 9.

The trailer support which is here shown and described is not, in itself, the direct subject-matter of this invention or of this application, but only insofar as the support is herein combined with the coupler to form a cooperative organization in which the support is operated by operation of the coupler. The drop leg support of the type herein described is primarily the subject-matter of my prior application Serial No. 579,569, filed February 24, 1945, entitled Drop leg and coupler interlock for trailers, now Patent No. 2,417,903, issued March 25, 1947.

The present application deals with that type of trailer and towing vehicle wherein the king-pin or similar coupling element is mounted upon the towing vehicle and the coupler mechanism is mounted upon the trailer. In a copending application filed on even date herewith, Serial No. 698,095, I have disclosed a design in which the flexible inter-connective means is capable of application to a trailer-tractor combination wherein the king-pin is mounted on the trailer and the coupler or lock is mounted on the tractor.

In the accompanying drawings, the frame or other equivalent structure of the trailer is designated generally by the numeral 20. The forward end of the frame is shown as provided with rollers 21 to support that forward end as it rides up over the tractor or a fifth wheel on the tractor; and the forward end of the trailer frame is also shown as being provided with a lower surface plate 22 having a longitudinal slot 23 reaching rearwardly from its forward edge for reception of the tractor king-pin which is indicated at 24. A coupler unit, generally designated by the numeral 25 is rotatably mounted on a vertical pivot pin or trunnion 26 which is suitably mounted on plate 22 or on other appropriate structure of the trailer frame in a position offset laterally from the closed inner end of slot 23. As here illustrated the lower end of pivot 26 is mounted directly on the plate 22, and its upper end is mounted in a bracket 27 which is attached to plate 22.

In its preferred design, as here shown the coupler unit 25 is made up essentially of an upper drum member 30 and a lower camming and locking member 31 forming a structure which is preferable integral. The lower camming and locking member 31 is preferably of small vertical thickness and somewhat flat in general form, as is shown in Fig. 3; and it lies close to frame plate 22. In general, this locking and camming member 31 comprises two arms which project from pivot 26 and which forms between them the king-pin receiving slot 35. One of these arms, designated 36, may be called the locking arm as its function is to hold the king-pin 24 at the rear end of plate slot 23, as shown in Fig. 2. The other arm, designated 37, may be called the coupler closing arm as its function is to swing the coupler from the open position of Fig. 1 to the closed position of Fig. 2 as king-pin 24 moves rearwardly in plate slot 23. Slot 35 between the two arms is preferably curved in formation as illustrated, its curved walls being formed by the opposing edge faces of the two arms 36 and 37.

The locking arm 36 has an upstanding lug 40 to which one end of run 41 of the connective cable is attached. This portion 41 of the cable lies closely above the upper face of the lower coupler member 31. The end of the other run 42 of the cable, lying at a higher elevation is connected to the higher upstanding lug 43 on the coupler arm 31. The two cable runs both bear upon drum 30, wrapping around opposite sides of the drum as is seen from Figs. 1 and 2, with cable run 42 at a relatively high elevation and cable end 41 preferably at a relatively low elevation. In all positions of the coupler, cable run 42 is shown as crossing over the coupler slot 35. Such crossing of the slot is not absolutely necessary, as will be realized when the operation of the coupler is understood, but it is desirable in order to provide room for the cable connective devices which are not flexible and cannot well wrap around the drum.

As will be evident from Fig. 2 which shows the position of cable end 42 in the closed position of the coupler, the extreme end of 42 might be connected to coupler arm 37 at about the point designated X in Fig. 2. If then the cable were flexible up to its extreme end there would be no interference with its wrapping flexibly about the drum. It is however desirable if not necessary that the cable be provided at its end with a suitable attachment element, and it is that attachment element of cable end 42 which crosses the coupler slot 35. As here shown, the attachment element comprises a sleeve or socket 45 in which the end of the flexible cable is secured, and a screw-threaded stud 46 whose end passes through the lug 43 and is secured by nuts 47. The other end 41 of the cable is provided with a duplicate attachment element which adjustably secures it to its lug 40. The two adjustments provide ample means for keeping the cable in tight tension.

It will be noted that the wall of circular drum 30 is not endless, but has a break or opening at 50 between two ends 30a and 30b. This break in the drum wall lies above coupler slot 35 so that the king-pin can enter slot 35 to a point close to central pivot 26, as shown in Fig. 2. The king-pin 24, as indicated in dotted lines in Fig. 3, has a head 24a at its upper end adapted to overlie the sides of the slot 35 in coupler member 31, to prevent the coupler from rising off the king-pin when the coupler is closed. The opening 50 in the drum wall, and the relatively high elevation of cable end 42, allow the headed king-pin to pass rearwardly and inwardly in coupler slot 35 to its ultimate locked position shown in Fig. 2. The opening 50 is shown as a complete break in the drum wall, forming an aperture in that wall extending to its top. It is only necessary however that this king-pin passing aperture extend up far enough to pass the king-pin head. The upper part of the drum wall can be continuous.

In its closed position of Fig. 2 the coupler stands with its locking arm 36 directly across slot 23, holding king-pin 24 at the closed rear end of the slot. To hold the coupler in that position, and also to hold the support in its non-supporting or raised position as will appear, any suitable lock or latch may be provided. That lock may be applied to any part of the system which enforcedly moves with the coupler in its opening movement, but is preferably applied directly to the coupler itself in a known form and manner. As shown, the lock comprises a latch bolt 50 projected by a spring 51 and withdrawn through the medium of a manually operable latch rod 52 and latch lever 53. When projected, the bolt projects in front of nose 36a of coupler arm 36. When withdrawn, the latch may either be held retracted until the forwardly moving king-pin swings the coupler nose past the bolt; or latch rod 52 may be releasably hooked in a position where nose 36a can pass the bolt by pressing it further back, and thus release the rod 52 from its hook so that the bolt will spring back to its fully projected position after coupler arm 36 passes it. (See, for instance, Patent No. 2,355,775 for full description.) In either case the latch is ready to re-lock the coupler whenever the latter swings to the closed position of Fig. 2.

As the king-pin moves outwardly in slot 23 the coupler must swing, from the closed position of Fig. 2 clear to the open position of Fig. 1 in order to finally release the king-pin. That is, coupler arm 36 must swing at least to the position (Fig. 1) where arm 36 clears slot 23; or, in the design as here shown with slot 35 having a concavely curved forward wall 35a, the arm must swing to a position where the nose 36b at the outer end of that slot wall clears slot 23. The slot wall is concavely curved to give the forwardly moving king-pin a relatively large mechanical advantage over any force tending to hold the coupler from opening, particularly at the start of the opening movement when the king-pin is in a position at the shortest radius from the coupler center. As will appear, the opening coupler may in some instances have to force the trailer support down and then forcibly lock it.

Except in a few particulars the drop leg trailer support which is shown in these drawings is in substance the same as that which forms the subject-matter of Patent 2,417,903. As best shown in Figs. 3 and 4, two supports 60 are provided at opposite sides of the forward part of the trailer frame. These two supports are operated directly from a single cross shaft 61 which extends across the frame between them. Cross shaft 61 carries a sheave 62 about which the cable 41, 42 is wrapped or trained. As the operation of the supports requires less than a half revolution of shaft 61, the cable 41, 42 is preferably not merely wrapped about sheave 62 but is passed around it as indicated in Fig. 3 and is clamped to the sheave at some suitable point as by the clamp indicated in Fig. 3 at 63. Seeing that both runs of the cable are positively attached to the coupler and to sheave 62 it is not necessary that the two runs be parts of a single length of cable. Fig. 3 shows the parts in the positions in which the coupler is open (Fig. 1) and the drop leg is down, and shaft 61 and sheave 62 have rotated to the counter-clockwise limit of their rotation. In passing from coupler 25 to sheave 62, the cable 41, 42 may either pass over idler sheaves mounted in the frame or over a pair of swinging sectors 64 which, for the limited movement of the cables, perform in substance the same offices as idler sheaves.

The two supports 60 are duplicates, except for right and left arrangement. As shown more particularly in Figs. 5 to 8, each support comprises a casing of which the lower part 70 forms a vertical guide for the vertically movable support leg 71, or carries within it the guides 70a which guide the vertically movable leg. At its lower end the leg is equipped for ground engagement, preferably carrying the ground engaging wheels 72 for that purpose. For the purposes of the present invention and application, these ground engaging wheels may be considered merely as the lower ground engaging end of the leg.

The upper or head part 75 of the casing houses and journals a crank-like dog which consists of a crank throw or dog 76 between two crank arms 77 which are carried on trunnions 78 journaled in the housing. By rotation, the dog 76 is adapted to be rotated between the extreme positions of Figs. 6 and 7. Fig. 6 illustrates the position when drop leg 71 is locked by the dog in its lowest position, and Fig. 7 illustrates the position of the dog when the drop leg is raised to its highest position.

The upper end portion of leg 71 is preferably equipped with several locking shoulders or steps, here illustrated as three in number and designated in upward order by the numerals 80, 81 and 82. These locking shoulders are stepped both vertically and horizontally from each other and are vertically separated by vertical surfaces or risers 80a and 81a. Each of these locking shoulders, instead of being flat or horizontal, is preferably formed as a curved surface which is concentric with the crank center when that particular shoulder surface is in a position to be directly engaged by dog 76. And the dog 76 is also formed with a concentrically curved outer surface. The lowermost step 80 is considerably longer in horizontal extent than the other two steps, the curved step 80 extending from one side surface 84 of the leg to a point approximately at or past the center of the leg. The leg is linked to the dog by a chain or other flexible connective element, shown at 85 (diagrammatically in Figs. 6 and 7). The upper end of this flexible connector is attached at 86 to the dog and the lower end attached at 87 to the leg. The arrangement is such that, with the dog rotated clockwise to its limiting position (Fig. 7) leg 71 is pulled up to a position where the long lower locking shoulder 80 lies immediately under the forward or lower edge 76a of the dog. As the dog is rotated counter-clockwise from a position of Fig. 7 toward and to the position of Fig. 6, the ground engaging leg will, if unobstructed, drop by its own weight ahead of the downward rotation of the dog. In normal unobstructed operation, the leg will thus drop freely until its lower end engages the ground or roadway, and in the meantime dog 76 will swing in counter-clockwise direction toward the position of Fig. 6, either until it reaches the position of Fig. 6, or until it brings up against one of the vertical step faces 80a or 81a and over locking shoulder 80 or 81. In any of those instances the dog will lock the leg down in substantially its ground engaging position.

If, however, the leg encounters some obstruction and does not drop far enough to allow dog 76 to pass freely over the lowermost locking step 80, then enforced rotation of the dog counter-clockwise from the position of Fig. 7 will force the dog downward against the outer end edge 80b of lower shoulder 80 and then force the leg down until the forward edge 76a of the dog can swing over the outer edge 80b of shoulder 80. Such position of shoulder 80 is indicated in dotted line in Fig. 7 at 80d. From that point on, further rotation of dog 76 counter-clockwise merely moves the dog over the then concentric shoulder surface 80, without having to force the leg further down, until the dog brings up against the vertical stop surface 80a. In that position of the dog, to which it is limited if the leg does not drop further, the nose end 76a of the dog is swung to about the position indicated by the line A in Fig. 6. In such a position it has swung through approximately the angle a from its position of Fig. 7, and it is removed from its final position of Fig. 6 by approximately the angle designated b. The total angle through which the dog moves from the position of Fig. 7 to the position of Fig. 6, which is the sum of angles a and b, is designated c. The cable transmission ratio between the coupler of Figs. 1 and 2 and the drop leg operating shaft 61 is preferably such that shaft 61 will normally be rotated through the whole angle c by virtue of rotation of the coupler between its closed and open positions.

If the leg had only one locking shoulder such as the shoulder 80, then to force the leg down to that locking position and to fully lock it in that position by the dog passing fully over the locking shoulder, the cable transmission ratio between the coupler and shaft 61 would be such that the dog would swing through, say, the angle b when the coupler swings between closed and open positions. In such an arrangement the opening coupler would force the leg down as before described and lock it in the one position to which it was forced. It is preferred however to have the multistep locking arrangement and to provide means which will enforcedly move the dogs to lock the supports on their first step (or otherwise will not allow the coupler to open) and at the same time will move the dogs to engage higher steps if the legs, or either of them, drop to a position where a higher step can be lockingly engaged. For that purpose the following arrangement is used.

As before stated, operating shaft 61 is rotated through the full angle c, counter-clockwise in Figs. 6, 7 and 9, when the coupler swings from the closed position of Fig. 2 to the open position of Fig. 1. That rotation is transmitted to each support through a lost motion unit which allows each dog 76 to lag behind the movement of shaft 61 by an amount equal to the angle b. Figs. 9 and 10 show the lost motion device. Each end of shaft 61 carries a sleeve 100 which rotates freely on crank shaft 78 of the dog. Two shoulders 101 and 102 on shaft 78 and a lug 103 in sleeve 100 provide movement freedom between them to the extent of angle b. A spring 104 may be used to urge shaft 78 ahead in a counter-clockwise direction (as viewed in Figs. 3, 6, 7 and 9)

so as normally to keep shoulder 101 against lug 103. If the dog of either support has to force its leg down, or if the leg drops only far enough to allow a dog to pass over lower shoulder 80 and bring up against vertical surface 80a, then that dog falls behind the full rotation of shaft 61 by taking up the lost motion to the extent of the angle b. At the same time, if one of the legs has dropped far enough to allow its dog to move over a higher locking shoulder, 81 or 82, its dog will do so, either under pressure of spring 104 or by momentum if the spring is not used.

In any case, whether the legs have single or multiple locking shoulders, the coupler cannot swing to its open position unless the locking dog of each support is at least safely over the first locking shoulder 80. If cable 41, 42 is considered as having no elastic stretch and other parts of the mechanism as having no elastic distortion under stress, then each dog must be fully over shoulder 80 and substantially against step face 80a when the coupler is in the open position of Fig. 1. And, due to the length of shoulder 80, the leg is safely locked long before the coupler opens to free the king-pin. The nose 76a of the dog lies approximately on the line denoted D in Fig. 7 when the dog begins to move over shoulder 80, then in the position indicated at 80d in that figure. In that position the dog has travelled only through about half the angle a; and a short further travel past line D places the dog in safe locking position over shoulder 80. With the dog in that safe position, the coupler has swung through only about one-half of its full opening angle and its locking arm 36 still lies at a sharp angle across slot 23 and still holds the king-pin. The safety margin of the system is thus very large.

That safety margin amply takes care of elastic distortion of the cable and other parts. If for any reason a considerable force has to be exerted to force a leg down and to move the dog over leg shoulder 80 elastic distortion may allow the coupler to reach the final open position of Fig. 1 when the locking dog is short of reaching face 80a. Shoulder 80 is long enough that the dog must be well over it, even when the parts are all elastically distorted under the maximum stress to which they are subjected.

But under those conditions of operation the coupler will tend to spring back from the position of Fig. 1 to a position where its arm 36 will partially or even completely close slot 23. Such a position is indicated in dotted lines at 36d in Fig. 2. To enable the king-pin freely to reenter the coupler under such conditions, the outer end of arm 36 is provided with an eccentric camming face 36e. When the rearwardly moving king-pin strikes that face the coupler is momentarily forced to its open position (Fig. 1) to pass the king-pin inwardly. The king-pin then moves on rearwardly in slots 23 and 35 to throw the coupler to closed position (Fig. 2). In so doing it swings the support dogs to disengage them from the legs and to raise the legs. The whole system is then finally held locked by latch bolt 50.

The mechanism described in the foregoing may be utilized as a mechanism for operating the support without operating specifically as a draft coupler between the towing vehicle and the trailer, as will be understood from the foregoing and the following considerations. Whether or not the mechanism is locked, as by latch 50, in the position of Fig. 2, and, consequently, whether or not the king pin or equivalent member 24 and the rotatable coupler 25 perform the function of draft-coupling the vehicles together, they still perform the function of operating the support through the interconnections 41, 42. Insofar as that function is concerned the coupler 25 may be viewed as one which acts as an operator for the support and as a coupler which couples the relatively moving and removable operating member (pin 24) with the support operating system. The following claims, except as they may be otherwise specifically limited, are to be understood in the sense here stated.

I claim:

1. In a tractor and semi-trailer combination in which the tractor and trailer are provided with co-operating elements including a coupler on one vehicle and a coupler operating element on the other vehicle, and in which the trailer is provided with a support movable between supporting and nonsupporting positions by back-and-forth rotation of a support operating element; a rotatively mounted coupler unit adapted to rotate back and forth between two positions, and a flexible interconnective belt comprising two runs each extending between and connected to the coupler unit and the rotary support operating element to transmit rotational movement between them, the two belt runs being effectively connected to the rotary coupler unit and the rotary operating element at opposite sides of their respective axes of rotation, so that upon rotation of the coupler unit in one direction or in the opposite direction movement is transmitted to the operating element by tension exerted respectively through one or the other of the belt runs.

2. In a tractor and semi-trailer combination in which the tractor and trailer are provided with interengaging draft elements including a draft coupler on one vehicle operable to engage the draft element on the other vehicle, and in which the trailer is provided with a support movable between supporting and nonsupporting positions by back-and-forth rotation of a support operating element; a rotatively mounted coupler unit including a coupling member having two arms which define a draft-element-receiving slot between them, a drum mounted on and rotating with the coupling member, and a flexible interconnective belt connected to the coupler unit wrapping around the drum and extending to and connected with the rotary support operating element.

3. In a tractor and semi-trailer combination in which the tractor is provided with a coupling element in the nature of a king-pin and the trailer is provided with structure forming a longitudinal king-pin-receiving slot and further provided with a support movable between supporting and nonsupporting positions by back and forth rotation of a support operating element; the combination which includes a coupler unit rotatatively mounted on the trailer over the king-pin slot, said coupler unit including a flat locking member lying closely over the king-pin slot and having two spaced arms which define a king-pin locking slot between them, a drum mounted directly on the locking member and extending upwardly from its upper face, the drum wall being apertured over the king-pin locking slot to provide for passage of the king-pin through the drum wall, and a flexible interconnective belt comprising two runs each extending between and connected to the locking member and the rotary support operating element to transmit rotational movement between them, the connections of the belt runs to the locking member being in such a plane that both runs wrap about the drum surface, and at least one of the belt runs being located in a plane which clears the aperture in the drum wall to allow passage of the king-pin.

4. In a tractor and semi-trailer combination in which the tractor and trailer are provided with interengaging draft elements including a draft coupler on one vehicle operable to engage the draft element on the other vehicle, and in which the trailer is provided with a support movable between supporting and nonsupporting positions by back-and-forth rotation of a support operating element; a rotatively mounted coupler unit adapted to rotate back and forth between open and closed positions, a flexible interconnective belt comprising two runs each extending between and connected to the coupler unit and the rotary support operating element to transmit rotational movement between them, and a cam surface on the coupler unit adapted by contact with the draft element on coupling operation to rotatively movement the coupler unit to open position.

5. The combination as defined in claim 3, and including also a cam surface on the outer end of one of the locking member arms and adapted, when engaged by the king-pin moving toward the locking member, to rotate that member in a direction to place the pin locking slot in the path of the king-pin.

6. In a tractor and semi-trailer combination in which the tractor and trailer are provided with co-operating elements including a coupler on one vehicle and a coupler operating element on the other vehicle, and in which the trailer is provided with a support movable between supporting and non-supporting positions by movement of an operating member in opposite directions; the combination of a coupler unit adapted to move back and forth between two positions, a tension transmitting connective member connected to and between the coupler unit and the support operating member and acting by transmitted tension to move that member in one direction when the coupler unit moves in one direction, and another tension transmitting connective member connected to and between the coupler unit and the support operating member and acting by transmitted tension to move that member in its opposite direction when the coupler unit moves in its opposite direction.

7. The combination defined in claim 6 and in which the two connective members are flexible.

8. The combination defined in claim 6 and in which the coupler unit includes a rotatively mounted coupling member having two arms which define between them a slot to receive the coupler operating element, a drum mounted on and rotating with the coupling member, and also in which the connective members are flexible and are wrapped around the drum.

9. In a tractor and semi-trailer combination in which the tractor and trailer are provided with co-operating elements including a coupler on one vehicle and a coupler operating element on the other vehicle, and in which the trailer is provide with a support movable between supporting and nonsupporting positions; a coupler unit comprising a rotatively mounted coupling member having two arms which define between them a slot to receive the coupler operating element and having a drum mounted on and rotating with the coupling member, and two flexible connective members connected to the coupler unit, wrapped around the drum, and connected to the support to move it by virtue of tensions exerted on the connective members when the coupler unit rotates.

10. A coupler unit of the type described, comprising a coupling member having an axis of rotation and having two arms extending from the axis in a radial plane and defining between them a slot to receive a coupler operating element, a circular wall mounted on the coupling member to rotate therewith and projecting from its plane, the coupler unit being provided with means to which a flexible connective member may be secured.

11. A coupler unit of the type described, comprising a coupling member having an axis of rotation and having two arms extending from the axis in a radial plane and defining between them a slot to receive a coupler operating element, a circular wall mounted on the coupling member to rotate therewith and projecting from its plane, the coupler unit being provided with means to which two flexible connective members may be secured in two planes spaced from the plane of the coupling member one further than the other.

12. A coupler unit of the type described, comprising a flat coupling member having an axis of rotation normal to its plane, said member having two spaced radially extending arms which define between them a slot to receive a coupler operating member, a drum mounted directly on the coupling member and extending axially from one of its faces, the drum wall being apertured over the slot to provide for passage of the operating member through the drum wall, the coupler unit being provided with means to which a flexible connective member may be secured in a plane spaced from said face of the coupling member and between the end planes of the drum.

WALTER BENNETT.

REFERENCES CITED

The following references are of record in the file of this patent:

UNITED STATES PATENTS

| Number | Name | Date |
| --- | --- | --- |
| 1,923,255 | Chambers | Aug. 22, 1933 |
| 2,215,903 | Edwards | Sept. 24, 1940 |